UNITED STATES PATENT OFFICE.

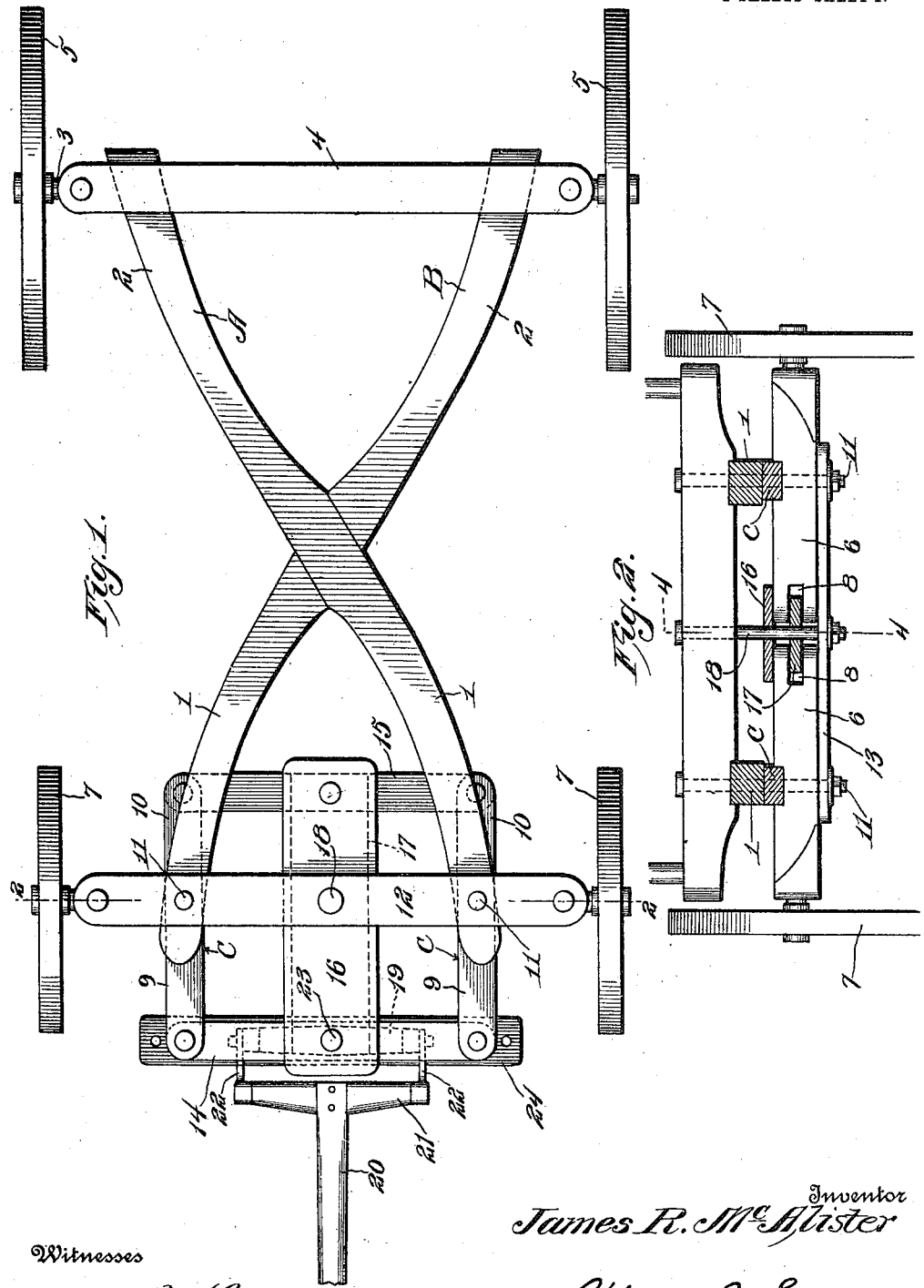

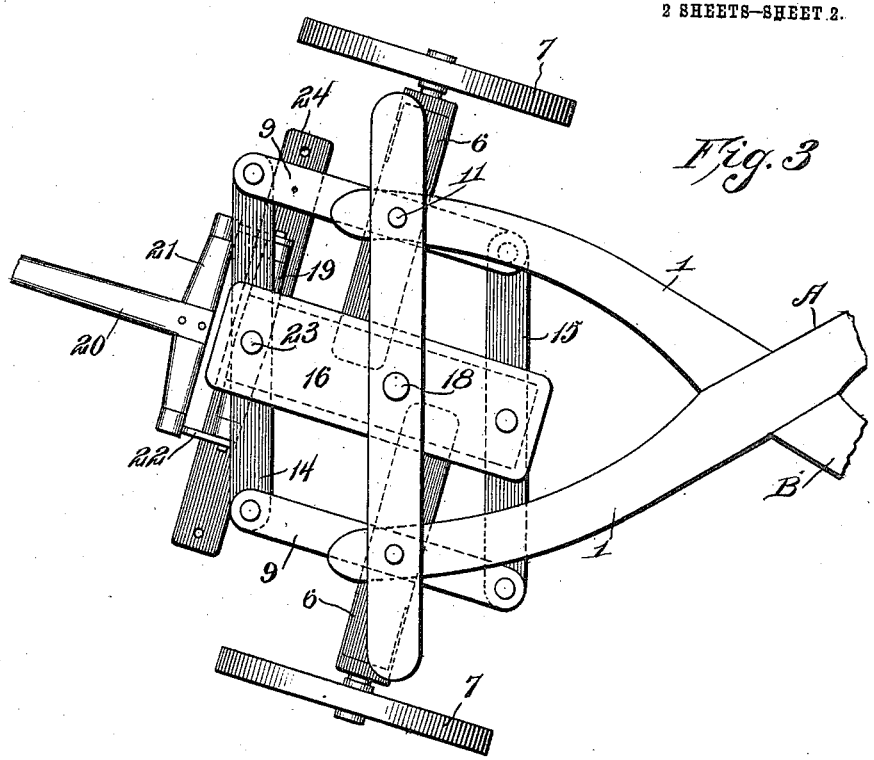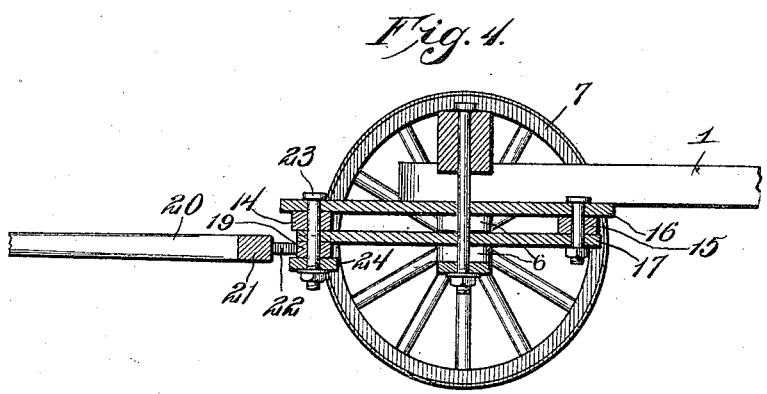

JAMES R. McALISTER, OF HAILESBORO, NEW YORK.

RUNNING-GEAR FOR WAGONS.

987,586. Specification of Letters Patent. Patented Mar. 21, 1911.

Application filed August 20, 1910. Serial No. 578,232.

*To all whom it may concern:*

Be it known that I, JAMES R. McALISTER, a citizen of the United States of America, residing at Hailesboro, in the county of St. Lawrence and State of New York, have invented new and useful Improvements in Running-Gears for Wagons, of which the following is a specification.

This invention relates to running gear for wagons, and it has for its main object to produce a simple and efficient running gear whereby the troublesome and objectionable whipping side motion of the tongue when the vehicle is passing over rough roads shall be prevented and whereby the steering and turning of the vehicle shall be facilitated.

With these and other ends in view which will readily appear as the nature of the invention is better understood, the same consists in the improved construction and novel arrangement and combination of parts which will be hereinafter fully described and particularly pointed out in the claims.

In the accompanying drawings has been illustrated a simple and preferred form of the invention, it being, however, understood that no limitation is necessarily made to the precise structural details therein exhibited, but that changes, alterations and modifications within the scope of the claims may be resorted to when desired.

In the drawings,—Figure 1 is a top plan view of a vehicle running gear constructed in accordance with the invention. Fig. 2 is a transverse sectional view taken through a front axle on the plane indicated by the line 2—2 in Fig. 1. Fig. 3 is a top plan view of the front portion of the running gear showing the vehicle in the act of turning. Fig. 4 is a vertical transverse sectional view taken on the line 4—4 in Fig. 2.

Corresponding parts in the several figures are denoted by like characters of reference.

The reach of the improved running gear is composed of two bars A, B mortised together and crossing each other diagonally so as to present forwardly extending arms 1, 1 and rearwardly extending arms 2, 2, the latter being supported upon the rear axle 3, said arms 2, 2 serving also to support the bolster 4. The axle 3 carries the rear wheels 5. The front axle is divided to form two stubs or members 6, 6 each carrying a wheel 7. The inner ends of said stubs are provided with horizontal notches 8. Firmly secured upon the upper sides of the stubs 6 are longitudinal bars C having forwardly extending arms 9 and rearwardly extending arms 10. The stubs 6 are pivotally secured adjacent to the undersides of the forwardly extending reach arms 1 by means of fastening members such as bolts 11 which also extend through the front bolster 12, through the longitudinal bars C and through a connecting bar 13 adjacent to the undersides of the axle members or stubs, the bolts 11 thus serving to assemble the bolster, the connecting bar and the axle members with the reach.

The forwardly extending arms 9, 9 and the rearwardly extending arms 10, 10 are connected together by parallel bars 14, 15 which are pivotally connected with said arms, said parallel bars serving to constitute link connections between the arms which extend forwardly and rearwardly from the axle members to transmit motion therebetween when said axle members are turned about the pivotal bolts 11, thereby causing them to move in unison and causing the front wheels 7 to be faced or presented in the same direction when the vehicle is in the act of being turned, as will be seen by reference to Fig. 3. The parallel bars 14, 15 are connected together by the upper and lower sand boards 16 and 17, the front and rear ends of which are pivotally connected with said parallel bars midway between the ends of the latter. A king bolt 18 extends vertically through the bolster, the sand boards and the connecting bar 13 which are thereby assembled in such a manner as to permit the sand boards to rock or oscillate the king bolt. The latter is disposed intermediate the inner ends of the axle stubs, and the notches 8 of said axle stubs engage and ride upon the edges of the lower sand board 17. The upper sand board lies adjacent to the upper faces of the axle stubs which are thereby protected and guided.

Mortised upon and securely connected with the lower sand board 17 adjacent to the front end of the latter is a cross bar 19 with which the tongue 20 is hingedly connected in any suitable manner, either by means of ordinary hounds or through the medium of a cross bar 21 having rearwardly extending clips or arms 22. A bolt or fastening member 23, which constitutes the pivotal connection between the front ends of the sand boards and the front bar 14 also extends through the cross bar 19 and through the evener 24 which serves in the usual manner for the attachment of the draft.

As will be seen from the foregoing description, taken in connection with the drawings, lateral strain exerted upon the tongue in either direction will be transmitted through the sand boards, the parallel bars 14, 15 and the longitudinal bars C to the axle stubs or members which may thereby be rocked or oscillated about their respective pivotal supports to permit the vehicle to be guided in the desired direction. The tongue, as is obvious, will be free from any tendency to sidewise whip motion. The stub axles will be firmly supported in the proper relation and will be effectively guided between the sand boards and the connecting bar 13, the lower sand board engaging the notches at the inner ends of the stub axles, as described. The general construction is simple, durable and of such a nature as to enable the parts to be conveniently assembled.

Having thus described the invention, what is claimed as new, is:—

1. In a running gear, a reach including bars having forwardly extending arms, wheel carrying stub axles connected pivotally with said arms and having horizontal notches at their inner ends, longitudinal bars connected with the stub axles and having forwardly and rearwardly extending arms, parallel bars connecting said forwardly and rearwardly extending arms, and sand boards connected pivotally with the parallel bars, one of said sand boards engaging the notches in the inner ends of the stub axles.

2. In a running gear, a reach including bars having forwardly extending arms, stub axles having longitudinal bars presenting forwardly and rearwardly extending arms, a bolster supported upon the reach arms, bolts extending through and assembling the bolster, the reach arms and the stub axles and constituting pivots about which the stub axles may turn, a bar connecting the bolts adjacent to the undersides of the stub axles, parallel bars pivotally connected with the forwardly and rearwardly extending arms of the longitudinal bars upon the stub axles, upper and lower sand boards connected pivotally with the parallel bars, the lower sand board engaging the notches at the inner ends of the stub axles, a king bolt extending through the bolster, the sand boards and the connecting bar and constituting a pivot about which the sand boards may rock, a cross bar mortised upon and connected with the lower sand board, and a draft member hingedly connected to said cross bar.

In testimony whereof I affix my signature in presence of two witnesses.

JAMES R. McALISTER.

Witnesses:
GROVER MORSE,
DELBERT J. GOINGS.

---

Copies of this patent may be obtained for five cents each, by addressing the "Commissioner of Patents, Washington, D. C."